United States Patent [19]
Slezak

[11] Patent Number: 6,006,257
[45] Date of Patent: Dec. 21, 1999

[54] MULTIMEDIA ARCHITECTURE FOR INTERACTIVE ADVERTISING IN WHICH SECONDARY PROGRAMMING IS VARIED BASED UPON VIEWER DEMOGRAPHICS AND CONTENT OF PRIMARY PROGRAMMING

[75] Inventor: Robert J. Slezak, Andover, Mass.

[73] Assignee: Comverse Networks Systems, Inc., Wakefield, Mass.

[21] Appl. No.: 08/720,035

[22] Filed: Sep. 27, 1996

Related U.S. Application Data

[60] Provisional application No. 60/004,575, Sep. 29, 1995.

[51] Int. Cl.$^6$ .............................. H04N 7/14; H04H 1/00
[52] U.S. Cl. .............................. 709/219; 348/12; 348/13; 455/5.1
[58] Field of Search .......................... 395/200.47, 200.48, 395/200.49; 455/2, 3.1, 4.1, 4.2, 5.1, 6.1, 6.2; 348/1, 2, 6, 7, 9, 10, 12, 13; 709/217–219

[56] References Cited

U.S. PATENT DOCUMENTS

| | | |
|---|---|---|
| 5,515,098 | 5/1996 | Carles . |
| 5,652,615 | 7/1997 | Bryant et al. ................................ 348/9 |
| 5,774,170 | 6/1998 | Hite et al. ................................... 348/9 |

FOREIGN PATENT DOCUMENTS

| | | |
|---|---|---|
| 0 536 628 A1 | 4/1993 | European Pat. Off. . |
| 0 656 728 A2 | 6/1995 | European Pat. Off. . |
| 0 680 214 A2 | 11/1995 | European Pat. Off. . |

OTHER PUBLICATIONS

Video entitled "Front Line".
PCT International Search Report For Corresponding PCT Application.

*Primary Examiner*—John W. Miller
*Attorney, Agent, or Firm*—Staas & Halsey LLP

[57] ABSTRACT

The system enables a user to dispose information such as an icon to identify the article that the user posts from the client computer, on the display screen thereof, for example, at the position closer to an icon of an article that another user posted if the former user intends to express the opinion positively to the latter user's posted article. The server computer where many client computers can post articles and read the articles posted from other client computers, manages the coordinate data of the icons respectively disposed at the client computers according to the respective intentions of the articles and reproduces the icons on the display screen of a client computer, at the respective disposed positions so that a user at the client computer can instantly understand the intentions of the posted articles without reading the contents thereof.

23 Claims, 11 Drawing Sheets

MULTIMEDIA ARCHITECTURE FOR INTERACTIVE ADVERTISING IN WHICH SECONDARY PROGRAMMING IS VARIED BASED UPON VIEWER DEMOGRAPHICS AND CONTENT OF PRIMARY PROGRAMMING

This application is a continuation-in-part of a provisional application, U.S. Ser. No. 60/004,575, filed Sep. 29, 1995, now pending.

BACKGROUND OF THE INVENTION

1. Field of the Invention

The present invention is directed to a multimedia architecture for providing interactive video programming to an individual subscriber, for example to a television set, and, more particularly, directed to a multimedia architecture that provides on demand programming interleaved with secondary programming, such as advertising, to a subscriber wherein the content of the secondary programming is dependent upon information gathered about the viewer.

2. Description of the Related Art

Current interactive applications are typically limited to the providing of on-demand movies, and games, via existing cable systems and telephone systems. For example, Bell Atlantic is currently testing an on-demand movie system wherein subscribers are able to, for a fee, select a movie, from a list of movies. The selected movie is then transmitted to the subscribers television set.

Currently, commercial messages, i.e. advertising, are delivered to a subscriber's TV from centralized broadcast facilities at either a national or local a level. The national and local providers simply fill-in designated, time-based, gaps in a primary video program with commercials. The commercials are, at best, picked based upon a demographic profile of a probable cross-section of viewers of the primary video programming. U.S. Pat. No. 5,515,098 to Carles, incorporated herein by reference, sets forth a device and method for distributing commercial messages to an individually addressable subscriber terminal on a network. In general, a database is generated using standard known poling techniques having data regarding each subscriber to the network. This database is generated by, for example, mail-in responses, telephone poling or in-person surveying. After the database has been generated, subscribers receive individualized commercial messages during the normal gaps provided in the primary video programming. Carles further sets forth a method for matching the commercial messages to the appropriate viewer based upon the information stored in the database.

However, to date, there has been no effective apparatus or method for providing interactive advertising or other multimedia services in conjunction with a primary video program. Further, there have been no provisions for utilizing the subscriber's television set to obtain statistical data regarding the subscribers. Additionally, there has been no effective apparatus or method for providing different commercials based upon the images being displayed in the primary video programming.

SUMMARY OF THE INVENTION

It is an object of the present invention to provide interactive advertising in conjunction with primary programming.

It is another object of the present invention to provide an interactive advertising system wherein the content of advertising is dependent upon prior interactions with the receiver of the advertising.

It is a further object of the present invention to provide a multi-media architecture wherein information obtained from a viewer alters the flow of material to the viewer.

It is yet another object of the present invention to provide on-demand primary programming with interactive advertising.

It is a further object of the present invention to provide a primary video stream which is interleaved with a secondary video stream at a time in the primary video stream wherein the images displayed by the primary video stream are related to the content of the secondary video stream.

It is yet another object of the present invention to provide a primary video stream having commercial message breaks which are dependent upon the content of the primary video stream and the demographics of an individual subscriber.

Additional objects and advantages of the invention will be set forth in part in the description which follows, and, in part, would be obvious from the description, or may be learned by practice of the invention.

These and other objects of the invention are achieved in an interactive multimedia system comprising video server means for providing a primary video program interleaved with secondary programming, the video server means being adapted to receive information from a viewer during display of the primary video programming and the secondary program, and database means for storing the information about a viewer and analyzing the information to generate viewer data which causes the video server means to vary the content of the secondary programming displayed to the viewer based on the viewer data.

Objects of the present invention are also achieved in a method of gathering data from a viewer comprising displaying a primary video program, interleaving a secondary multimedia programming with the display of the primary video program, presenting questions to the viewer during at least one of the primary video program and the secondary multimedia programming, receiving answers to the questions from the viewer, and varying the content of the secondary multimedia programming based on the answers.

Objects of the present invention are further achieved in a method of displaying comprising displaying a primary video program having a varying content, generating a video stream breaks file correlating the content of the primary video program with the timing at which the content is displayed, interleaving secondary multimedia programming with the display of the primary video program, varying the content of the secondary multimedia programming based on the video file stream breaks file.

Objects of the present invention are also achieved in an interactive multimedia system comprising subscriber database means for storing subscriber data regarding demographic along with preferences of a subscriber, a video breaks database means which stores video breaks data correlating a content of a primary video program with a timing at which the content exists within the primary video program, and video server means for providing the primary video program to an individual viewer interleaved with secondary programming selected based on a correlation between the subscriber data and the video breaks data.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Interactive advertising involves interrupting a primary video programming stream, (or simply, the primary program) being shown to a viewer (or subscriber) generally comprising movies or educational material, at a predetermined time, with one or more secondary video programming streams (or simply, the secondary programs), typically comprising advertising, educational or other commercial material. Additional facilities are provided to overlay textual and/or graphical material on the display and to receive input from the viewer. Thus, for example, the secondary video programming stream may be used to interactively request information from the viewer, such as demographics and shopping preferences. The information obtained from the viewer may be utilized to preselect additional secondary video programming streams for display at a future time. The timing of the display of the secondary program may depend upon the responses from the viewer and/or the content of the primary program.

For example, when a viewer selects a movie to view as the primary program, he can be prompted to select whether he wishes to view the movie, for full charge without secondary programs, i.e. advertising, the same movie for half charge with some secondary programming presented during the movie, or the same movie at no charge with secondary programming including interactive advertising and questions, requiring a response from the viewer, presented during the movie. The nature of the secondary programming presented to the viewer can vary based on a number of determining factors, including the movie currently selected, a past history of the movies selected, the scene in the current movie at which the advertising will be displayed, previously collected demographic information about the viewer. In the case of interactive advertising, the advertising can change based upon the viewer's response to the questions presented during the interactive advertising in addition to any of the previous mentioned determining factors.

Thus, for example, if a viewer selects an action movie as the primary program, if at some point a truck is highlighted in a scene, secondary programming material can be interleaved which presents an advertisement related to a local truck dealer carrying a similar model of truck being shown in the primary programming. Alternatively, in an educational setting, the secondary programming can be tailored to a viewer's level of knowledge. For example, if a viewer has a low technical skill level (as determined by prior interactive sessions), the primary programming can be interleaved with secondary programming matter explaining technical concepts presented in the primary program. Alternatively, if the viewer has a high level of technological awareness, the primary program would be interleaved only with minimal secondary programming material.

Alternatively, the secondary programming can be an interactive presentation requesting input from the viewer in the above examples. For example, the viewer could be prompted to indicate whether, in fact, the viewer desires to see the secondary programming. Alternatively, the viewer can be requested to answer questions about the material seen in the primary program to determine the amount of secondary programming needed. This feature would be especially useful in the educational environment. Any information collected during the secondary programming sessions can be stored in a database and used in future sessions to further refine the content of the secondary programming. The preferred embodiments are described as an interactive advertising system, however the uses for such as system are not limited to advertising, but may be used, for example, for education and entertainment. Further, while the primary and secondary programs are described as being videos, they may also comprise animations, graphics, text, audio or any other multimedia medium.

The primary program and secondary program are preferably encoded in the MPEG1 format. The MPEG1 format requires a throughput averaging 1.5 megabits per second to provide a fair quality picture. An E1 or T1 wiring protocol is well adapted to handle such throughput. If higher quality video is desired, an MPEG2 encoding can be used. However, MPEG2 encoding requires a higher average throughput, typically in excess of 4 megabits per second, and as such would require an advance network such as ATM or other broadband facilities.

Figure 1:
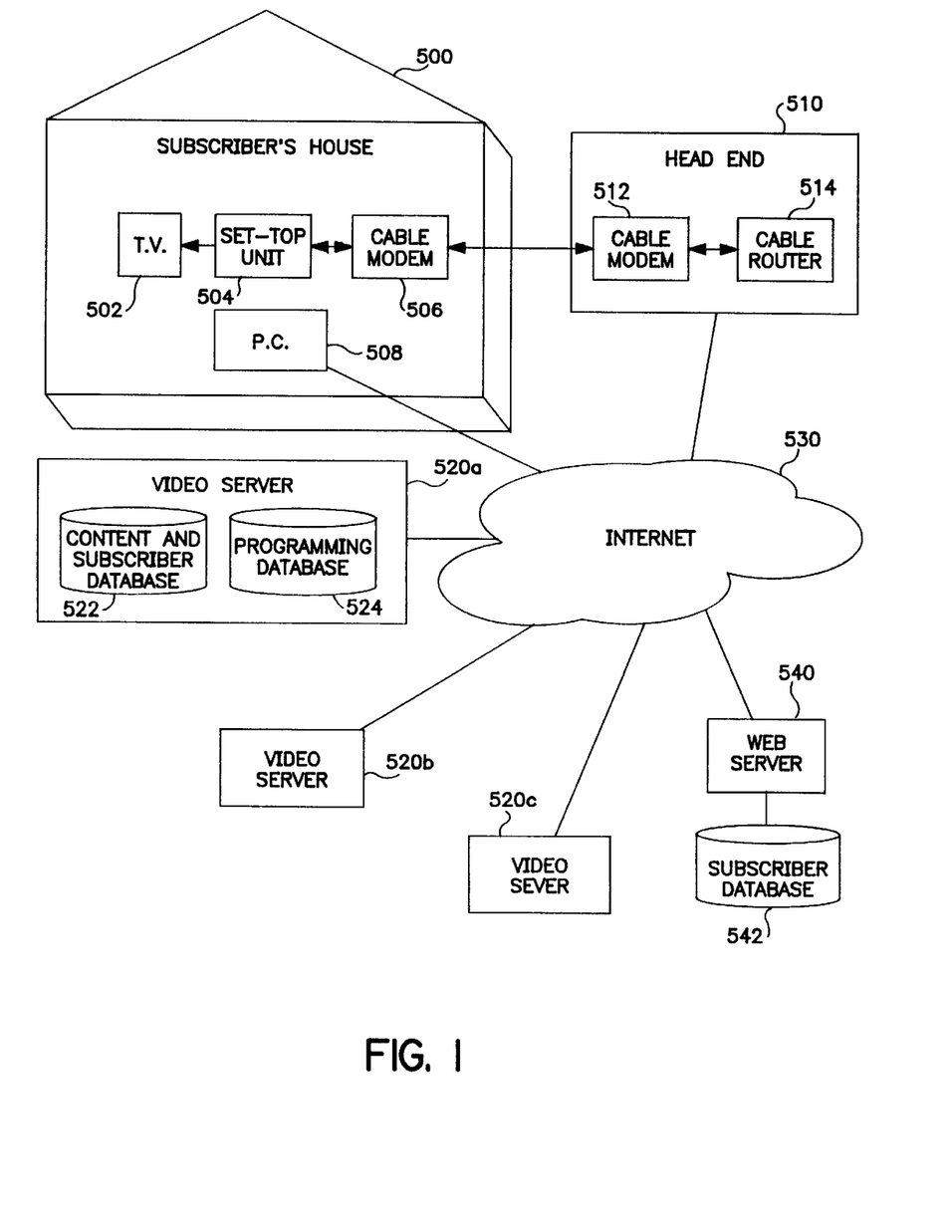
FIG. 1 is a block diagram of an interactive advertising system in accordance with a first preferred embodiment of the present invention.

FIG. 1 is a block diagram of an interactive advertising system in accordance with a first preferred embodiment of the present invention. In accordance with the first preferred embodiment, the primary and secondary programming material is delivered to a subscriber's house 500 via the Internet 530.

Each subscriber's house 500 is provided with a standard known TV 502 which is attached to a set-top unit 504, described hereinafter. The set-top unit 504 is connected to a standard cable modem 506. An off-the-shelf P.C. 508 can be optionally provided The set-top unit 504 and the optional P.C. 508 provide the interface to the interactive advertising system. A cable modem 506 is typically connected to a head end 510 via an existing subscriber based cable network. The head end 510 comprises a cable modem 512 connected to the cable modem 506 and the subscriber's house 500. The cable modem 512 is connected to a cable router 514 for delivering individualized programming material to each subscriber's house 500.

The head end 510 is connected to the Internet 530. Also connected to the Internet are a series of video servers 520a–520c. Each video server 520, discussed hereinafter, contains a content and subscriber database 522 and a programming database 524. The programming database 524 stores the primary and secondary programming. The content and subscriber database 522 stores statistical information regarding each of the subscribers, including demographics, network address and other related information. Additionally, the content and subscriber database 22 stores content information regarding the primary and secondary programming stored in the programming database 524. For example, with respect to video movies, the content and subscriber database 522 would store timing and scene information regarding each movie so as to enable a correlation between a content of a scene and the subscriber's demographic data.

A standard Web server 540 is also connected to the Internet 530. The Web server 540 serves out Web pages in HTML format to the Internet 530 in what is called the World Wide Web. The Web server 540 is connected to a subscriber database 542 which is typically a table relating a subscriber's IP address with his cable router address.

In use, a subscriber will access the Web server 540 using a standard Web Browser via an optional personal computer 508 or the set-top unit 504, which in this configuration would preferably comprise an Internet ready device. Using the Web Browser, the subscriber selects a primary program, e.g. a movie from the Web pages displayed by the Web server 40, which he wishes to view on the TV 502. The Web server 540 accesses the subscriber database 542 to resolve the subscriber's address. Thereafter, the Web server 540 directs the appropriate video server 520 to begin delivery of the primary program. The appropriate video server 520 can be selected based upon geographic location, the location of the subscriber's information, or even the location of the programming material. Thereafter, the video server 520 delivers the primary and secondary program material to the cable router 514 and the head end 510 via the Internet 510. The cable router 514 routes the program material to the appropriate subscriber's house 500. As the set-top unit 504 provides a two way communication route with the video server 520, an interactive viewing session can be carried out, as discussed hereinafter.

While the link to the set-top unit 504 from the head end 510 has been described as a standard cable base subscriber system, one of ordinary skill in the art will recognize that an asymmetric digital subscriber link may also be utilized. Further, various additional links such as a T1 or an E1 data line may also be utilized.

Figure 2:
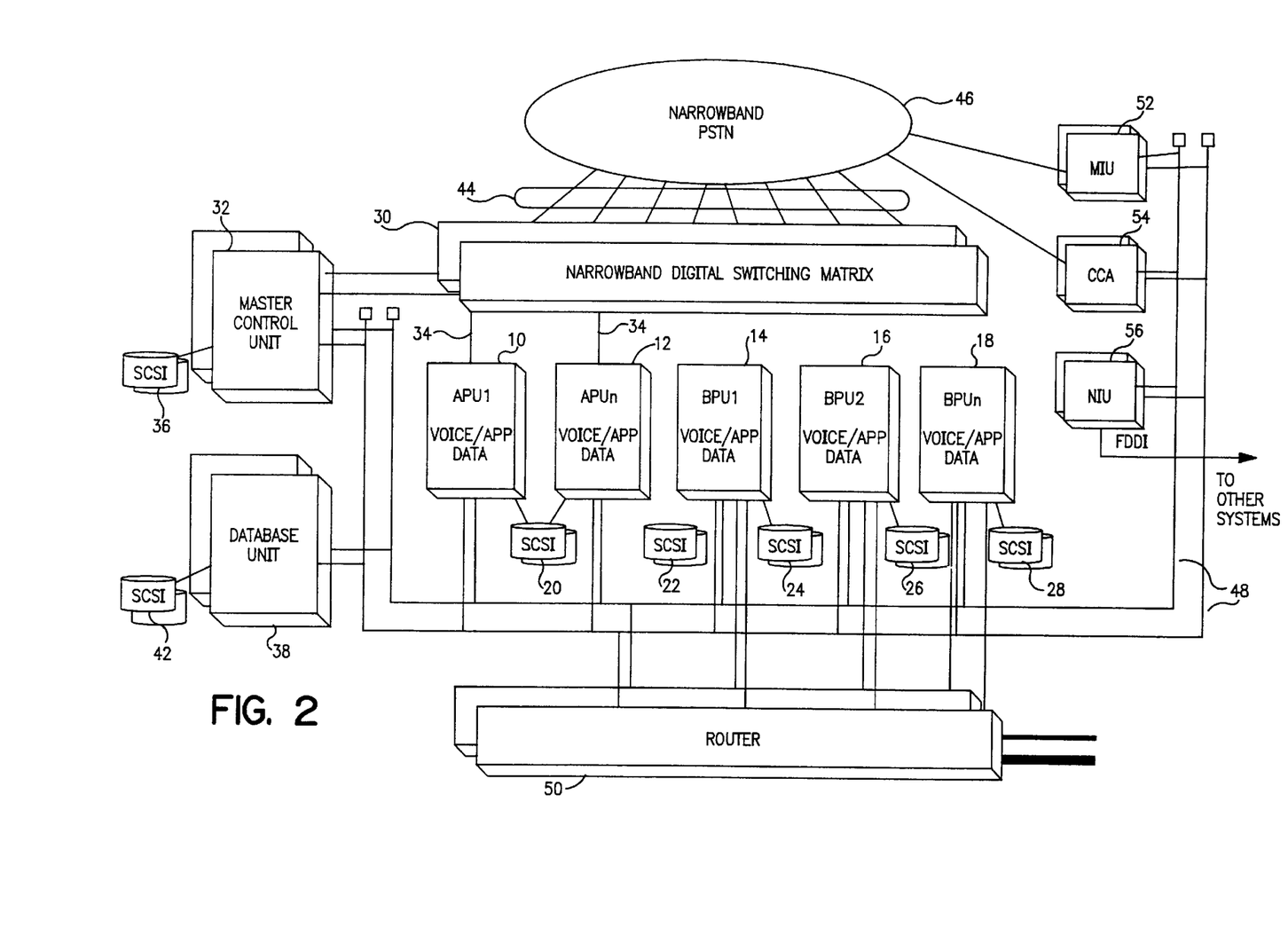
FIG. 2 is a block diagram of a video server in accordance with the first preferred embodiment of the present invention.

FIG. 2 is a block diagram of a video server 520 in accordance with the first preferred embodiment of the present invention. Specifically, FIG. 2 sets forth a video server 520 which can form an interactive advertising system for use in outputting signals to a broad band public network, for example, ATM, OC12, etc or a broadcast cable system as used in the preferred embodiment. This system is particularly adapted to providing programming over existing cable-TV networks utilizing standard co-axial cabling to each subscriber's home.

In accordance with the preferred embodiments of the present invention, the video server 520 may be realized on a modular multimedia architecture which utilizes multiple application processing units (hereinafter APU). U.S. Pat. No. 5,029,199 and U.S. Pat. No. 5,193,110, incorporated herein by references, describe a distributed control and storage systems which may be modified, in accordance with the present invention to produce a system for providing interactive advertising. In accordance with the first preferred embodiment of the present invention APUs 10 and 12 are utilized to handle voice and application data. Additionally, three broad band processing units, 14, 16 and 18 (hereinafter BPU,) are utilized to handle video applications and video data, which are outputted to a router 50. The router 50 interfaces with the Internet 530 (or directly to a broad band network). As shown in FIG. 1, APU 10 and APU 12 share a SCSI disc 20. The APU 12 has access to a SCSI 22. Likewise BPU 14, BPU 16 and BPU 18 each have access to SCSI discs 24, 26 and 28, respectively which operate as the programming database 524 and holds video programming including movies and advertisement.

The APUs 10 and 12 are connected to a narrowband digital switching matrix 30 via T1 lines. The narrowband digital switching matrix 30 is connected to a narrowband private switched telephone network (hereinafter PSTN) 46 via E1 lines 44. A master control unit controls the narrowband digital switching matrix 30 and the router 50. The master control unit 32 is connected to the APU 10, the APU 12, the BPU 14, the BPU 16, the BPU 18 and the router 50 via an ethernet backbone 48. Preferably the master control unit 32 has an associated SCSI disc array 36. A database unit 38, for collecting and analyzing data from each of the various components, is also connected to the ethernet backbone 48. Preferably the database unit 38 is provided with a SCSI disk array 42. The database unit 38 acts as the content and subscriber database 522 and stores various information about subscribers to the system including demographics, past viewing history, past answers to interactive questions, and other information as necessary. Additionally, the database unit 38 can be programmed to make decisions regarding when to interrupt a movie with advertising and what advertising programming to use. However, the BPUs can also be programmed for this task.

An multiple integration unit 52 (hereinafter MIU) is connected to the narrowband PSTN 46 using an SMDI (simplified message desk interface) protocol. The MIU 52 is also connected to the ethernet backbone 48. The MIU 52 interfaces with other telephone systems, such as PBXS. A call control adjunct (CCA) 54 is connected to narrowband digital switching matrix 30 and to the narrowband PSTN 46 via the common channel system signaling 7 protocol (hereinafter CSS7). The CCA 54 is also connected to the ethernet backbone 48. A network interface unit 56 (hereinafter NIU) is connected to the ethernet 48 and interfaces to other systems via FDDI (fiber distributed data interface).

As shown in FIG. 2, the master control unit 32, the database unit 38, the narrowband switching matrix 30, the MIU 52, the CCA 54, the NIU 56 and the router 50 are each preferably provided with a backup redundancy unit.

The MCU 32 acts to assign an incoming call (in the case of voice mail, which can also include requests for video programming), via the narrow band PSTN 46. The MCU32 directs requests for video programming, via the router 50 or the narrow band PSTN 46, to an appropriate APU or BPU over the ethernet backbone 48. Control data messages between the MCU 32 and the APUs or BPUs, or between the APUs and the BPUs, is routed over the ethernet backbone 48.

During operation, a request for voice or video services is issued via the narrowband PSTN 46 or the Internet via the router 50. If the services are voice services, such as voice mail, the master control unit 32 routes the request to an appropriate APU for service of the request by an APU via the narrowband digital switching matrix 30. If the request is for video services, the master control 32 routes the request, via the ethernet backbone 48, to the appropriate BPU which provides services via the router 50, but may, with the addition of an appropriate link, be output via the in narrow band digital switching matrix 30.

In general, the video programming provided by the BPUs may be either normal entertainment/educational programming or advertisement programming. The BPUs may access the database unit 38 to determine what type of programming to provide to a subscriber. The programming may be divided among the BPUs or arranged dynamically. Further, a single massive disk array may be used and the requests for services allocated across the BPUs based on the number of requests.

Figure 3:
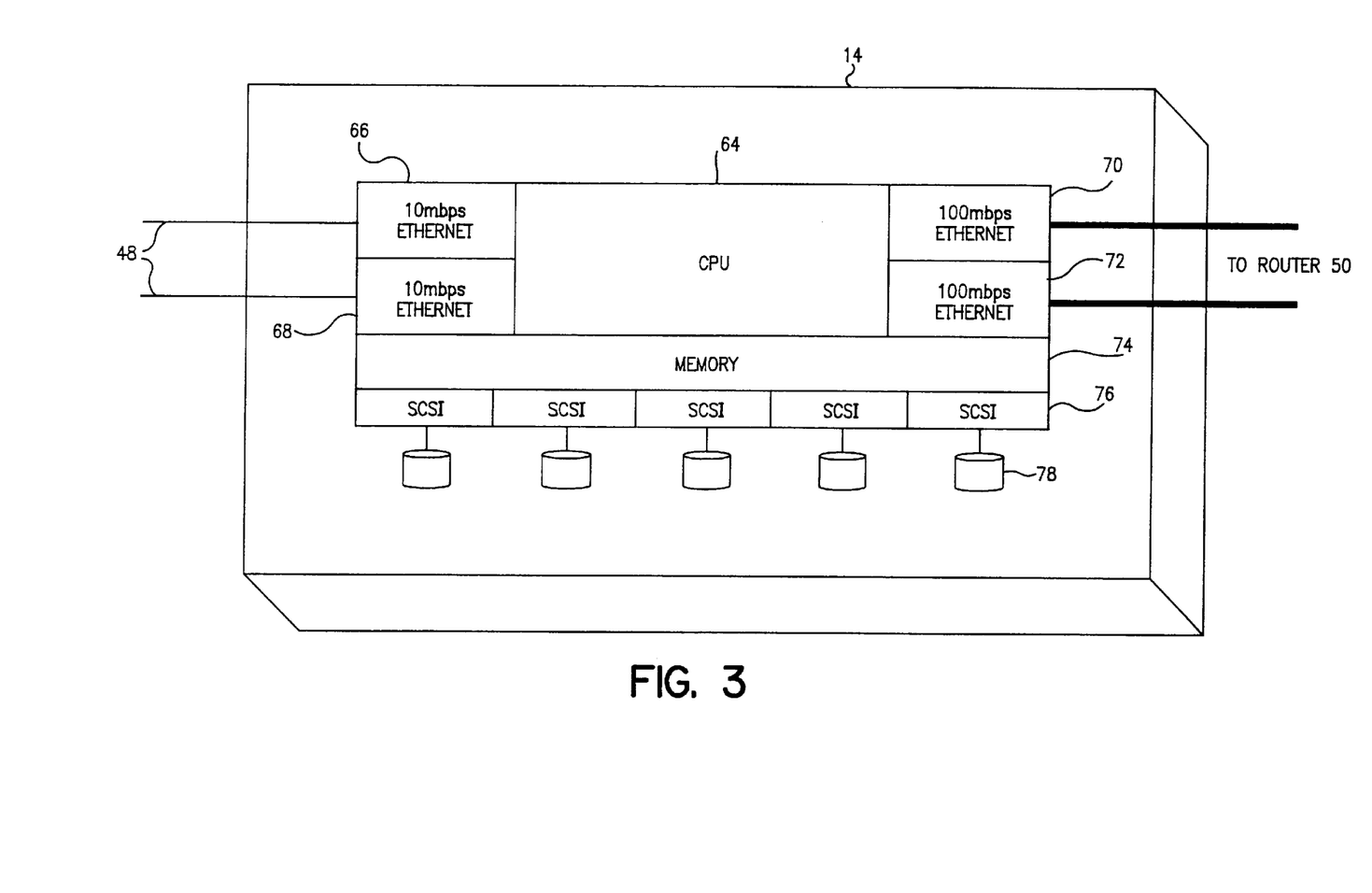
FIG. 3 is a broad band processing unit for use in the video server in accordance with the first preferred of the present invention.

FIG. 3 is a block diagram of a BPU 14 for use in the video server 520 in accordance with the first preferred embodiment of the present invention. The BPU 14 is provided with a CPU 64 which interfaces with the ethernet backbone 48 via 10 mbps ethernet adapters 66 and 68. The CPU 64 outputs a signal via 100 mbps ethernet adapters 70 and 72 to the router 50. The BPU 14 is provided with an internal memory 74. An array of SCSI adapters 76 interface with an associated array of SCSI discs 78 which preferably store the primary and secondary programming material. The CPU 64 can, for example, comprise a 200 megahertz pentium processor. In addition, each BPU can, for example, comprise a standard PC mother board provided with the appropriate IO cards.

Although the first preferred embodiment of the present invention has been described with respect to a specific configuration, will be recognized at the first preferred embodiment is not limited to the specific configuration. For example, while the present system has been described as outputting video signals to a router 50 for transmission over the Internet 53, the router 50 can transmit information directly to the head end 510 via a broad band PSTN or the narrow band PSTN 46. However, the narrow band PSTN 46 would have to provide an appropriate signal throughput for handling the video data.

Figure 4:
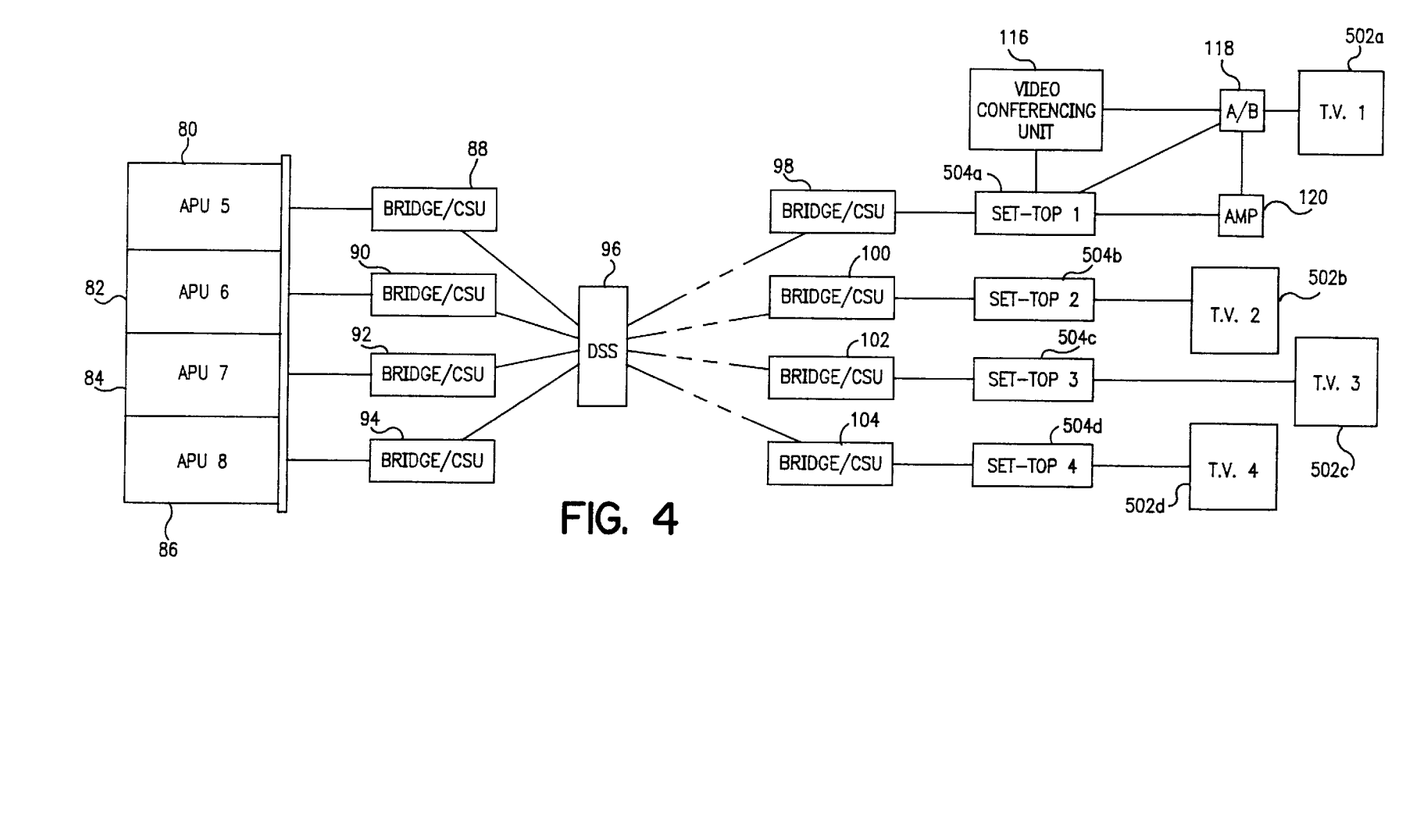
FIG. 4 is a block diagram of an interactive advertising system in accordance with a second preferred embodiment of the present invention.

FIG. 4 is a block diagram of an interactive advertising system in accordance with a second preferred embodiment to the present invention. An APU 80 and an APU 82 interface via an ethernet network with bridge/CSU units 88 and 90, which in turn interface with a digital switching system 96 (hereinafter DSS). Similarly, an APU 84 and an APU 86 interface with a DSS 96 via bridge/CSU units 92 and 94. The bridge/CSU units 88, 90, 92 and 94 preferably output the via E1 lines. The output of the DSS 96 is converted back into a ethernet signal via CSU/bridge units 98, 100, 102 and 104. Set-top units 504a–504d interface with the CSU/bridge units 98, 100, 102 and 104, respectively. The set-top units 504a–504d facilitate interaction between the APUs and the subscriber via TVs 502a–502d. The set-top unit 504a is further connected to a video conferencing unit 116, which provides video conferencing services via the TV 502a. The set-top unit 504a is connected to the TV 502a via an A/B switch 118, which also interfaces with the video conferencing unit 116. An alternative line with an amp 120 is provided for signal clarity.

Figure 5:
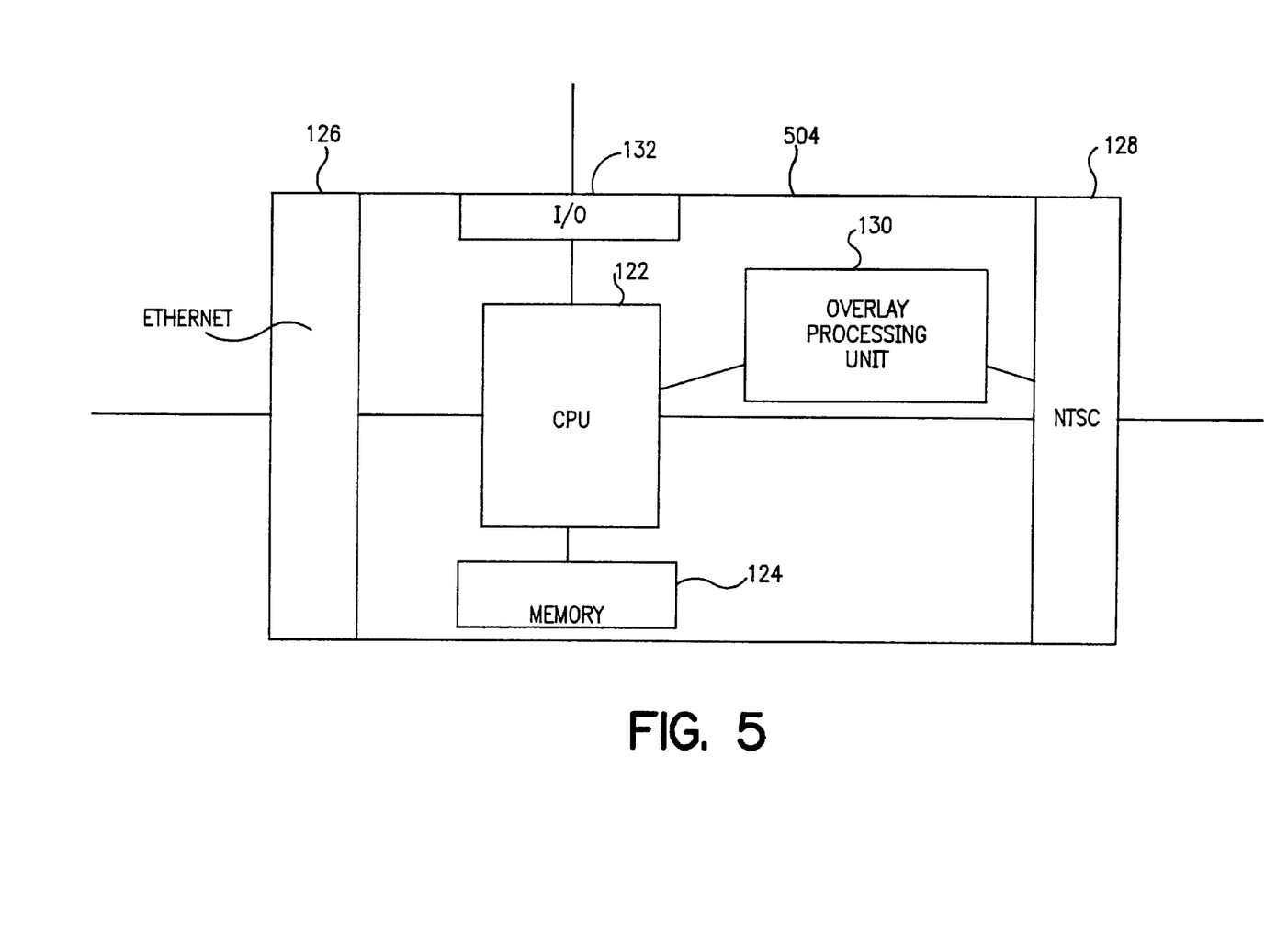
FIG. 5 is a block diagram of a set-top unit in accordance with the preferred embodiments of the present invention.

FIG. 5 is a block diagram of a set-top unit 504 for use in an interactive advertising system in accordance with the preferred embodiments of the present invention. Preferably, the set-top unit 504 is configured around general purpose computer, i.e. a standard PC. A CPU 122 interfaces with the ethernet interface 126 for communication with the APUs. An I/O unit 132 allows the viewer to interact with the set-top unit 504 via number of inputs, such as a keyboard, mouse, or an infrared remote control. An NTSC interface card 128 provides a signal to the TV 502. Additionally, an overlay processing unit 130 enables the CPU 122 to overlay text and graphics on top of a video stream. A memory 124 is connected to the CPU 122.

The overlay processing unit 130 can be used to display texts and graphics to a viewer in conjunction with, or independently of the primary or secondary programming currently being displayed. For example, a list of movies could be displayed overtop a primary program showing a continuous stream of trailers showing each movie. Thereafter, when a viewer selects a certain movie, such as with an inferred remote control unit, a keyboard or a mouse, the set-top unit 504 requests, from an assigned video server 520, a secondary program showing a longer trailer regarding the selected movie while the overlay processing unit displays a message requesting the viewer to input whether he wishes to receive the movie for free, with a lot of advertising, for half the price with minimal advertising, or for full price with no advertising. Further, the overlay processing unit can be used during the advertising programming segments to take an order for the advertised product, request input from the viewer regarding the viewers responses to the advertising, the desirability for future advertising regarding the product shown during the advertising radio programming, or other demographic information. Additionally, the overlay processing unit 130 can be adapted to display other services, such as e-mail, video mail, voice mail (within an appropriate speech to text translator), faxes, etc.

In use, a viewer interacts with a set-top unit to request video services, i.e. primary and secondary programming, from the BPUs. The BPUs deliver video services through the router 50 and the Internet 530 (in the first preferred embodiment) or the digital switching service 96 (in the second preferred embodiment) to the appropriate set-top unit 504, which displays the output on a TV 114. The overlay processing unit 130 enables the display of menus and other messages to the subscriber displaying information or prompting for input.

Figure 6:
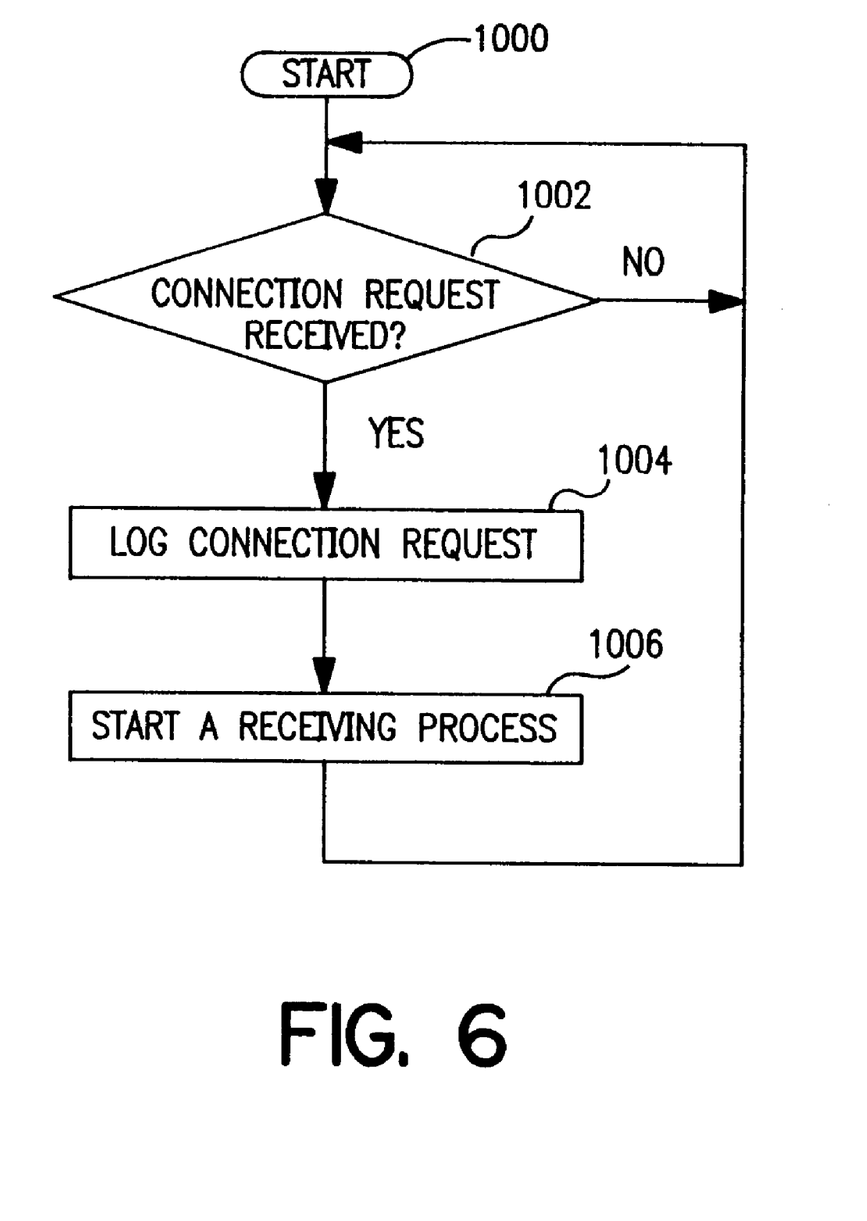
FIG. 6 is a flow chart of the top level process for the video server in accordance with either the first or second preferred embodiments of the present invention.
Figure 7:
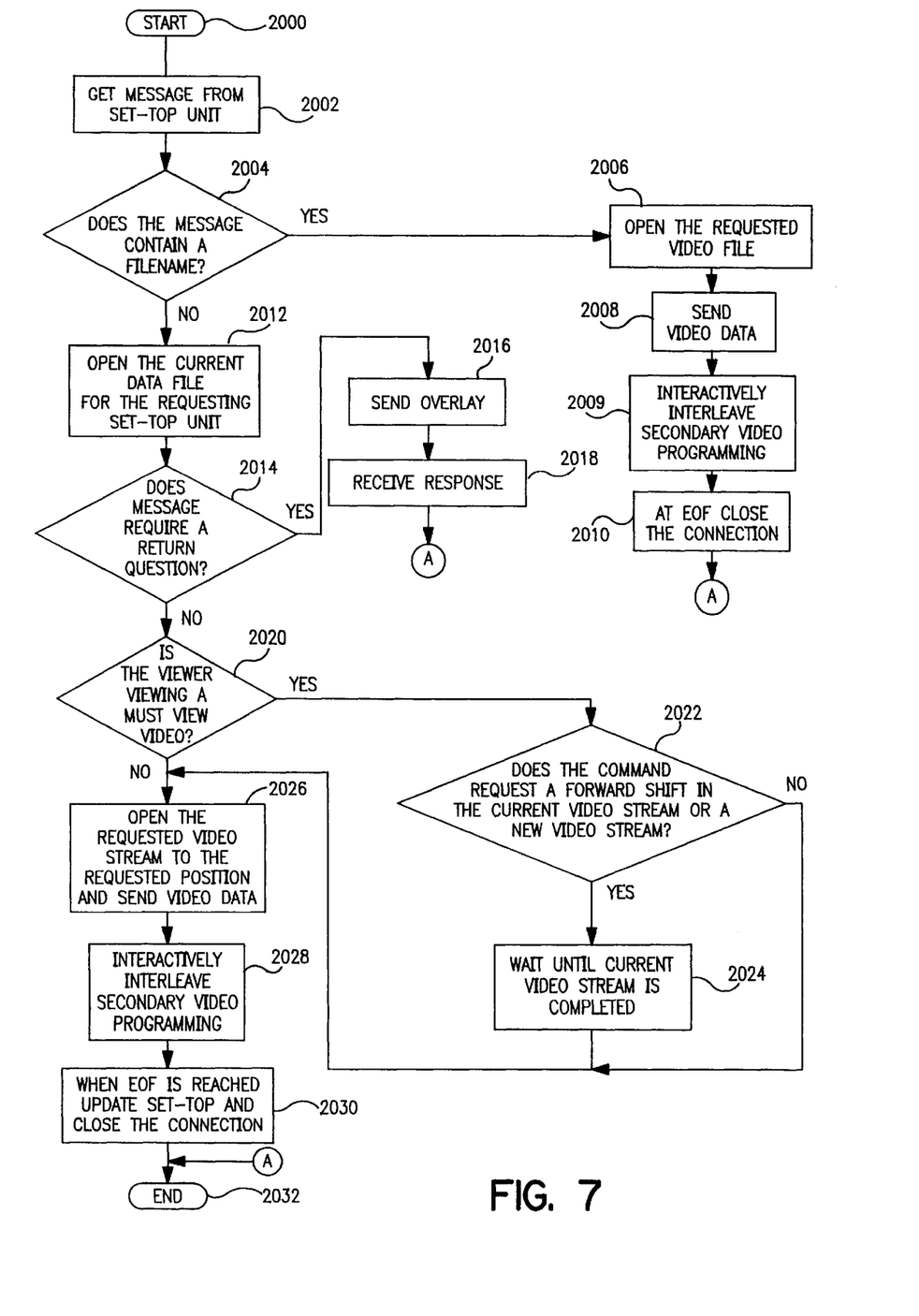
FIG. 7 is a flow chart of a receiving process in the video server in accordance with the preferred embodiments of the present invention.

FIG. 6 is a flow chart of the top level process for the video server in accordance with either the first or second preferred embodiment of the present invention. For the sake of clarity, the processor will be described with respect to the first preferred embodiment. The process starts in step 1000. Thereafter, the video server 520 waits until a connection request is received in step 1002. The connection request can come via the Web server 540 over the Internet 530 or directly from the subscriber's P.C. 508. Once a connection request is received, it is logged in step 1004, subsequently, a receiving process, see FIG. 7, is started in step 1006. After the receiving process has completed the process returns to step 1002.

FIG. 7 is a flow chart of a receiving process in the video server in accordance with the preferred embodiments of the present invention. The receiving process is started in step 2000. Thereafter, the video server 520 gets a message from the set-top unit 504 in step 2002. In step 2004, the message is reviewed to determine whether it contains a file name. If the message contains a file name, the requested video file is opened in step 2006. The process shown and described in FIG. 7 is directed toward providing a primary video stream as the primary program and a secondary video stream as the secondary program, but other types of streams may be used such as simple graphics or audio. The team stream indicates that the data is sent and received as a linear, or non-linear, sequence of data. The term will become more clear in reference to FIG. 9 which shows a typical MPEG stream which preferably constitutes the primary and secondary video streams. Thereafter, a send video data process is started, see FIG. 8, in step 2008. In step 2009, a secondary video program is interactively interleaved with the primary video programming. When the end of file of the primary video programming is reached, the connected is closed in step 210 and the receiving process is ended in step 2032.

If, in step 2004, the message does not contain a file name, it is deemed to be a command requesting a change in the flow of the primary video program, such as rewind, fast forward, pause, stop or the presentation of a secondary video program. In step 2012, the data file of the requesting set-top unit 504 is opened. Thereafter in step 2014 it is determined whether the message requires additional information, such that a question needs to be displayed on the TV 502. If a return question is to be displayed, an overlay is sent to the overlay processing unit 130 in the set-top unit 504 in step 2016. Thereafter, a response is received in step 2018 and the process ends in step 2032. If the response can be handled by the set-top unit 504, such a process is initiated. However, if the response needs to be handled by the video server 520, the response is treated as another message from the set-top unit and another receiving process is started with the response being entered as the message.

If, in step 2014, the message does not require a return question, it is determined whether the viewer is viewing a "must view" video in step 2020. A "must view" video may comprise, for example, advertising when the viewer has indicated that he wishes to receive advertising in return for a reduced cost of viewing the primary video programming. Alternatively, a "must view" video may also comprise, secondary video programming for which the advertiser has paid a premium fee to insure that a certain segment of the population receives it. Alternatively, in an educational setting, a "must view" video may comprise certain key points of the educational material which the student is required to view. If the viewer is viewing a "must view" video, the process proceeds to step 2022 where it is determined whether the command requests a forward shift in the current video stream or an entirely new video stream. If command does request a forward shift or change from the current video stream, the process is waited until the current "must view" video stream is completed in step 2024.

Once it has been determined that the viewer is not viewing a "must view" video, the process proceeds to step 2026 wherein the requested video stream is opened to the requested position in the command. At this point, the requested video data is sent in a sending process, see FIG. 8. Thereafter, in step 2028, secondary video programming is interactively interleaved into the primary video programming. In step 2020, when the end of file of the primary video programming is reached, the set-top is updated and the connected is closed. Subsequently, the process ends in step 2032.

Figure 8:
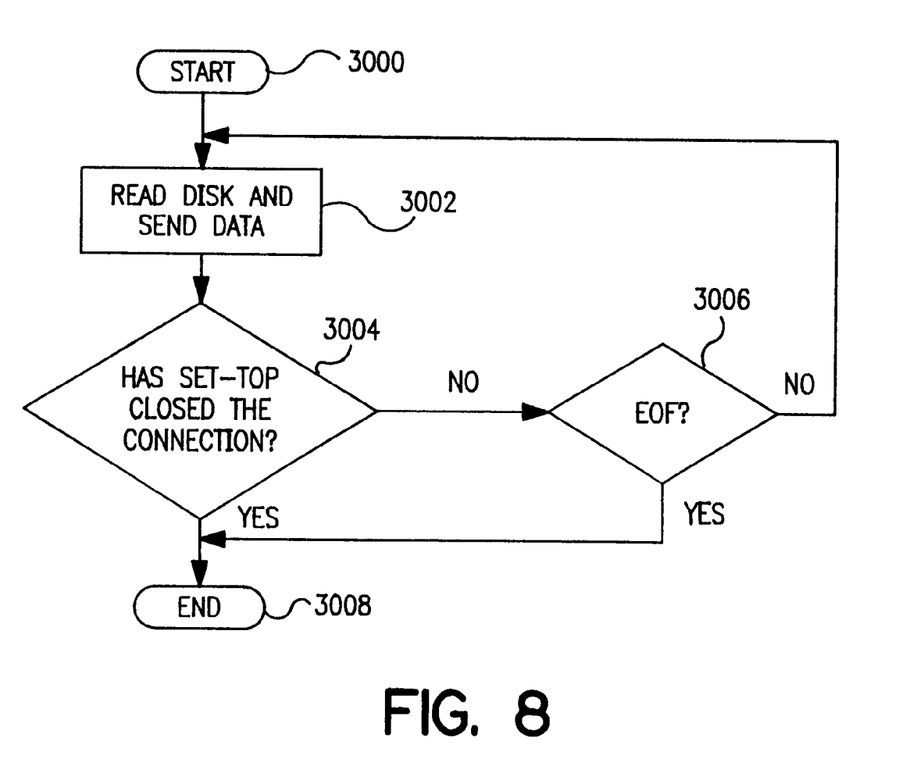
FIG. 8 is a flow chart of the send video data process used in the video server in accordance with the preferred embodiments of the present invention.

FIG. 8 is a flow chart of the send video data process used in the video server in accordance with the preferred embodiments of the present invention. The sending process starts in step 3000. In step 3002 data is read from the disk and sent to the set-top unit 504 via the Internet 530. Thereafter, in step 3004, it is determined whether the set-top unit has closed the connection. If the set-top unit 504 has not closed the connection, it is determined in step 3006 whether the end of file of the data being sent has been reached. If the end of file has not been reached, the process continues to read the disk and send data in step 3002. Once the set-top has closed the connection in step 3004, or the end of file has been reached in step 3006, the process ends in step 3008.

The interleaving of secondary video programming with the primary video programming can be performed at time based intervals, or based upon the content of the primary video programming. Additionally, because of the presence of a return communication path from the set-top unit 504, the secondary video programming can also be contingent upon commands received from the set-top unit 504. Additionally, it is important to note, that the secondary video programming can also be considered primary video programming to further secondary video programming, thus in effect allowing a hierarchical tree of video programming to be presented to the subscriber.

In general, in order to attain interleaving based upon the content of the primary video programming, the primary video programming must be analyzed prior to display, and a series of records generated setting forth the timing and subject matter of the material being displayed during the primary video programming. For example, various subject matters can be defined in relationship to the secondary video programming and assigned numbers which are then stored as a record with the respective timings in the primary video programming.

Figure 9:
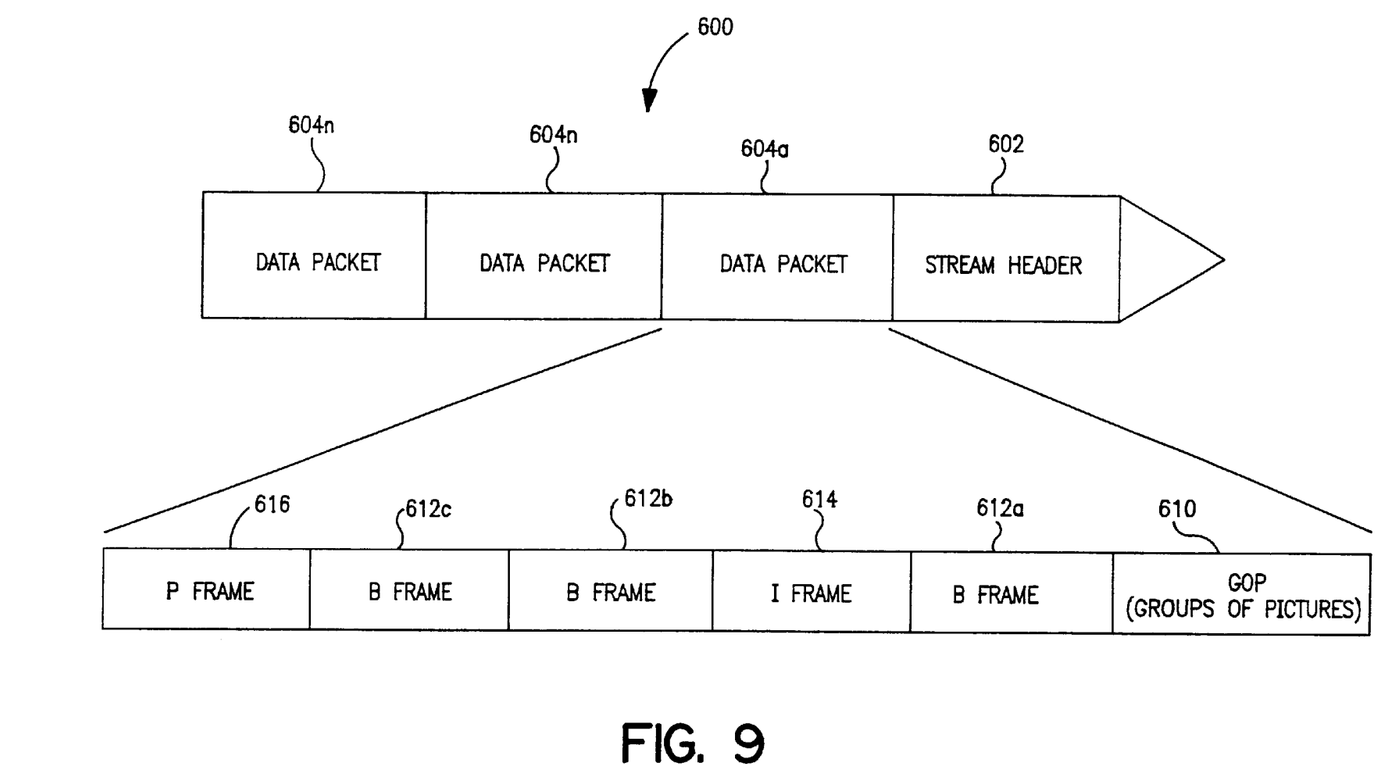
FIG. 9 is a diagram of an MPEG stream as used in the preferred embodiment of the present invention.

FIG. 9 is a diagram of an MPEG stream 600 as used in the preferred embodiment of the present invention. An MPEG stream 600 comprises a stream header 602 followed by a series of data packets 604a to 604n. The stream header 602 includes information on the time at which the first data packet in the stream 600 is to be played. In the preferred embodiments, the primary and secondary programs are MPEG streams and are referred to as the primary video stream and the secondary video stream.

Each data packet 604 comprises a group of pictures (GOP) 610 and a series of frames. In general, there are three types of frames, a b-frame 612, an i-frame 614 and a p-frame 616. The i-frame 614 comprises a full frame, while each of the b-frame 612n and the p-frame 616n contain predictive changes to the full frame, contained in the i-frame 614.

Figure 10:
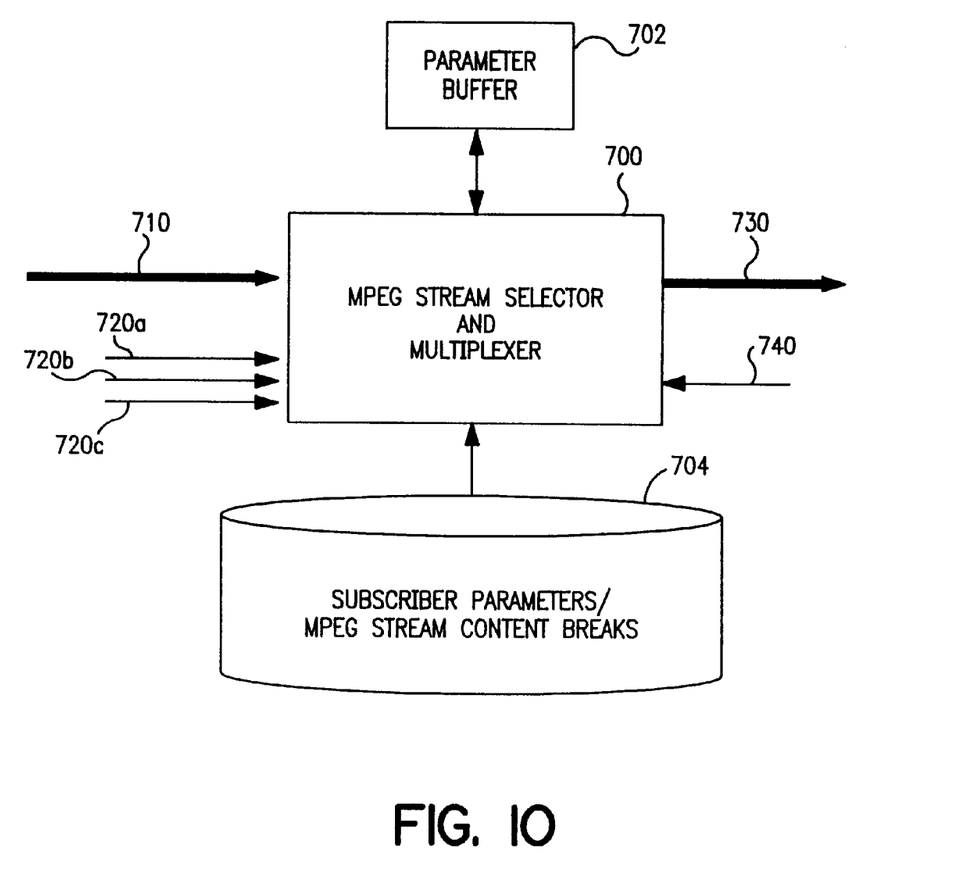
FIG. 10 is a block diagram of an MPEG stream selector and multiplexer as used within the video processor in accordance with the preferred embodiments of the present invention.

FIG. 10 is a block diagram of an MPEG stream selector and multiplexer 700 as used within the video processor in accordance with the preferred embodiments of the present invention. Preferably, the MPEG stream selector and multiplexer 700 is realized in software in each BPU and executed by the CPU 64. The MPEG stream selector and multiplexer 700 is provided with a parameter buffer 702 (preferably in the memory 74) and a subscriber parameters/MPEG stream content breaks database 704 (preferably formed in the array of SCSI disks 78). The MPEG stream selector and multiplexer 700 receives and multiplexes a MPEG content stream 710, i.e. the primary video stream, and MPEG commercial segments 720a–720n, i.e. the secondary video stream. A single MPEG output stream 730 is output by the MPEG stream selector and multiplexer 700. An input line 740 is provided to enable the BPU or set-top unit 504 to control the selection of the primary and secondary video streams in response to commands from the subscriber.

Figure 11:
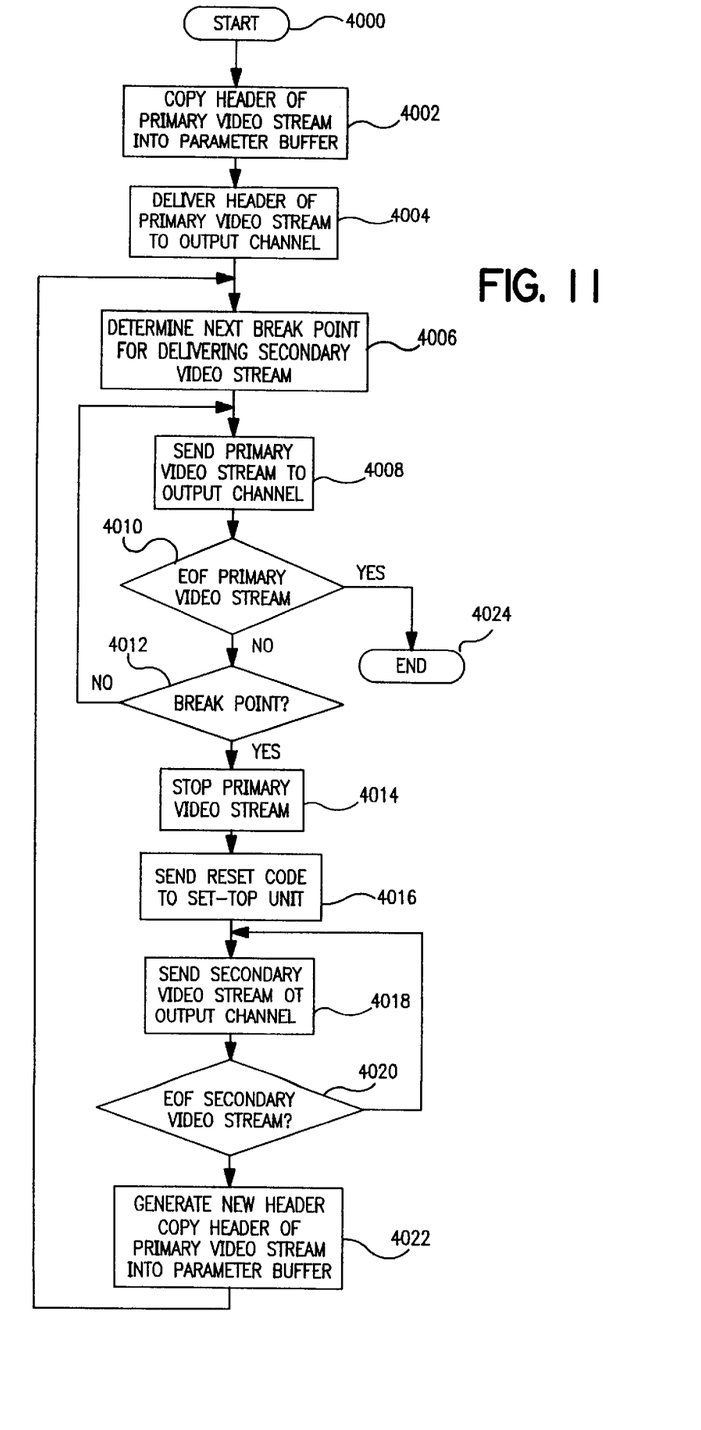
FIG. 11 is a flow chart of an interleaving process in accordance with the preferred embodiments of the present invention.

FIG. 11 is a flow chart of an interleaving process in accordance with the preferred embodiments of the present invention. The process starts in step 4000. The header of the primary video stream is copied into the parameter buffer in step 4002. Concurrently, the header of the primary video stream is delivered to the output channel 730 in step 4004.

In step 4006, the next break point in the primary video stream is determined. The break point is the point at which the secondary video stream should be interleaved with the primary video stream. This decision is made based upon information contained in the subscriber parameters/MPEG stream content breaks database 704 or in response to a command from the subscriber. Typically, the subscriber parameter/MPEG stream content breaks database 704 will be generated prior to the showing of the primary video stream for each individual subscriber, by correlating the demographic data contained in the content and subscriber database 522 with timing and subject information which has been previously generated about the primary video programming. While the interleaving process is being shown and described as being a linear process, it will be recognized by one of ordinary skill in the art that parallel processing can be used, wherein the break points are determined concurrently with the displaying of the primary video stream.

In step 4008, the primary video stream is sent to the output channel. In step 4010, it is determined whether the end of file of the primary video stream has been reached. If the end of file has been reached, the process ends in step 4024.

If the end of file has not been reached, it is determined whether a break point has been reached in step 4012. If a break point has not been reached, the process returns to step 4008 and continues to send primary video stream to the output channel 730.

However, if, in step 4012, a break point has been reached, the primary video stream is stopped in step 4014. Subsequently, in step 4016, a reset code is sent to the set-top unit. Thereafter, in step 4018, a secondary video stream, e.g. the MPEG commercial segment 720a–720b is sent to the output channel 730.

Once the end of file of the secondary video stream has been reached in step 4020, a new stream header 602 is generated in step 4022. A copy of this header is stored in the parameter buffer 702. The new header contains new timing information regarding the playing of the remainder of the primary video stream. After the new header has been stored, in step 4022, the process returns to step 4000 and the next break point is determined.

As shown and described above, the preferred embodiments of the present invention enable an individualized video programming stream to be transmitted to a subscriber's house. The individualized video programming stream comprises a primary program, preferably formed of a primary video stream and a plurality of interleaved secondary programs, preferably formed of secondary video streams. The secondary video programs are interleaved, based upon input received from the viewer, subject matter being displayed in the primary material, and/or demographic and personal data regarding the subscriber stored in a database. Additionally, as the system is interactive, the data regarding each viewer stored in the database can be updated in response to questions, by the overlay processing unit 130, presented during the presentation of either the primary or secondary material. While the system has been described with respect to an interactive advertising system, one of ordinary skill in the art will also recognize that it can be utilized in a variety of educational and entertainment scenarios.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An interactive multimedia system comprising:

a video server providing a primary video program interleaved with secondary programming, said video server receiving information from a viewer during display of the primary video program and the secondary programming; and a database storing the information from the viewer and analyzing the information to generate viewer data which causes said video server to vary the content of the secondary programming displayed to the viewer based on the viewer data at a timing based upon a content of the primary video program.

2. An interactive multimedia system, as set forth in claim 1, further comprising:

an interface which receives the primary video program and the secondary programming from said video server and displays the primary video program and the secondary video programming on a monitor to the viewer.

3. An interactive multimedia system, as set forth in claim 2, wherein said interface overlays the primary video program and secondary programming with graphics.

4. An interactive multimedia system, as set forth in claim 3, wherein the graphics are in the form of questions to which the user supplies answers.

5. An interactive multimedia system, as set forth in claim 4, wherein said interface receives the answers supplied by the user and transmits the answers to said database.

6. An interactive multimedia system, as set forth in claim 5, wherein said database uses the answers supplied by the user to vary the content of the secondary programming.

7. An interactive multimedia system, as set forth in claim 2, wherein said interface gathers information from the viewer and transmits the information to said video server.

8. An interactive multimedia system, as set forth in claim 1, wherein the primary video program is a video stream.

9. An interactive multimedia system, as set forth in claim 8, wherein the primary video program is a movie.

10. An interactive multimedia system, as set forth in claim 1, wherein the secondary programming comprises an advertisement.

11. A method of gathering data from a viewer comprising:

displaying a primary video program;

interleaving secondary multimedia programming with the display of the primary video program;

presenting questions to the viewer during at least one of the primary video program and the secondary multimedia programming;

receiving answers to the questions from the viewer while the questions are being presented; and varying the content of the secondary multimedia programming based on the answers.

12. A method of displaying comprising:

displaying a primary video program having a varying content;

generating a video stream breaks file correlating the content of the primary video program with the timing at which the content is displayed;

interleaving secondary multimedia programming with the display of the primary video program;

varying the content of the secondary multimedia programming based on the video stream breaks file.

13. An interactive multimedia system comprising:

a subscriber database for storing subscriber data regarding demographics along with preferences of subscribers;

a video breaks database which stores video breaks data correlating a content of a primary video program with a timing at which the content exists within the primary video program; and a video server providing the primary video program to an individual subscriber interleaved with secondary programming selected based on a correlation between the subscriber data and the video breaks data.

14. An interactive multimedia system comprising:

a database which stores information about a content of a primary video program based on time;

a video server which outputs a signal representative of the primary video program interleaved with a secondary video program, the interleaving of the secondary video program being at a timing responsive to the information.

15. An interactive multimedia system comprising:

video server means for providing a primary video program interleaved with secondary programming, said video server means being adapted to receive information from a viewer in response to display of the primary video programming or the secondary programming; and database means for storing the information and analyzing the information from the viewer to generate viewer data which enables said video server means to vary the interleaving and the content of the secondary programming displayed to the viewer.

16. An interactive multimedia system comprising:

a database which generates viewer data based on information about a viewer;

a video server providing a primary video program interleaved with secondary programming selected based on the viewer data and at a timing based on a content of the primary video program, said video server receiving information about the viewer from the viewer and supplying the information about the viewer to said database.

17. An interactive multimedia system, as set forth in claim 16, wherein:

said video server receives information about the viewer from the viewer in response to display of one of the primary video programming and the secondary programming.

18. An interactive multimedia system, as set forth in claim 16, further comprising:

an interface receiving the primary video program and the secondary programming from said video server and displaying the video programming on a monitor to the viewer.

19. An interactive multimedia system, as set forth in claim 18, wherein said interface overlays the primary video program and secondary programming with graphics.

20. An interactive multimedia system, as set forth in claim 16, wherein the primary video program is a video stream.

21. An interactive multimedia system, as set forth in claim 20, wherein the primary video program is a movie.

22. An interactive multimedia system, as set forth in claim 16, wherein the secondary programming comprises advertisement.

23. A video delivery system utilizing the Internet, comprising:

an interface unit, provided at a subscriber's location, receiving and displaying subscriber video programming via the Internet and providing information via the Internet; and a video server connected to the Internet including:

a programming database storing primary video programs and secondary programming, said programming database including routines for providing subscriber video programming by interleaving a primary video program with secondary video programming; and a content and subscriber database storing the information from the viewer and analyzing the information to generate viewer data for the routines used to create the subscriber video programming, the viewer data indicating the content of secondary programming to displayed being varied based on the viewer data and a timing of the display of the secondary programming being varied based upon a content of the primary video program.

* * * * *

UNITED STATES PATENT AND TRADEMARK OFFICE
CERTIFICATE OF CORRECTION

PATENT NO. : 6,006,257
DATED : December 21, 1999
INVENTOR(S) : Robert J. Slezak

It is certified that error appears in the above-identified patent and that said Letters Patent is hereby corrected as shown below:

Title page,
ABSTRACT, delete abstract entirely, and insert ABSTRACT
-- An interactive multi-media system having a video server for providing a primary video program interleaved with secondary multimedia programming and a database for storing information about a viewer and the content of the primary video program. The secondary multimedia programming has a varying content determined by the data contained in the database, and as such, can be changed based upon an individual viewer's demographics in conjunction with the subject matter being displayed by the primary video program. Preferably, the system is accessed via the Internet, wherein the subscriber's house is connected to an Internet head end or node via a cable modem. --

Column 1,
Line 33, change "local a" to -- a local --;
Lines 42 and 45, change "poling" to -- polling --.

Column 4,
Line 42, change "as" to -- a --.

Column 5,
Line 2, after "provided" insert -- . --.

Signed and Sealed this

Twenty-third Day of April, 2002

Attest:

Attesting Officer

JAMES E. ROGAN
Director of the United States Patent and Trademark Office